3,830,854
SUBSTITUTED 5,8 - DIMETHYL - 5,6,7,8-TETRAHYDRO-1-NAPHTHOLS

Edward R. Degginger, Convent Station, and James M. Balquist, Morristown, N.J., assignors to Allied Chemical Corporation, New York, N.Y.
No Drawing. Filed Jan. 8, 1970, Ser. No. 1,568
Int. Cl. C07c 79/24
U.S. Cl. 260—622 R                9 Claims

ABSTRACT OF THE DISCLOSURE

Materials can be protected from attack by insects, mites and nematodes by applying to the material a 5,8-dimethyl-5,6,7,8-tetrahydro-1-naphthol having the formula

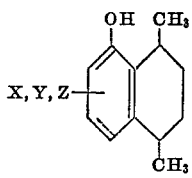

wherein X, Y and Z are substituents independently occupying the 2, 3 and 4 postions; X is hydrogen, fluorine, chlorine, or bromine; Y is fluorine, chlorine, bromine, nitro or lower alkoxy; and Z is hydrogen or nitro. The tetrahydronaphthols wherein Z is hydrogen can be prepared by cyclialkylating a phenol having corresponding X and Y substituents (Y not being nitro) with 1,5-hexadiene in the presence of a catalyst such as aluminum phenate. Alternatively, tetrahydronaphthols wherein X and/or Y are chlorine or bromine can be prepared by direct halogenation of the cyclialkylation product. Tetrahydronaphthols wherein Z and/or Y are nitro can be prepared by nitrating the cyclialkylation product.

---

This invention relates to substituted 5,8-dimethyl-5,6,7,8-tetrahydro-1-naphthols and to their use as pesticides.

In accordance with this invention, materials can be protected from attack by a member of the group consisting of insects, mites and nematodes by applying to the material an effective amount of a 5,8-dimethyl-5,6,7,8-tetrahydro-1-naphthol having the formula

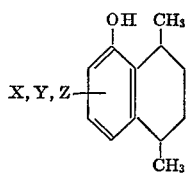

wherein X, Y and Z are substituents independently occupying the 2, 3 and 4 postions; X is hydrogen, fluorine, chlorine, or bromine; Y is fluorine, chlorine, bromine, nitro or lower alkoxy; and Z is hydrogen or nitro, preferably hydrogen. The term "lower alkoxy" refers to alkoxy groups having from 1 to 4 carbon atoms.

The naphthol is applied to the material to be protected in the form of a pesticidal composition comprising the naphthol and a suitable diluent which forms a fine dispersion of the naphthol on plants or other materials to be protected. Suitable solid diluents include talcums, diatomaceous earth, wood flours, and silica gels. Where the diluent is a solid, the composition preferably contains from 0.1 to 1.0 weight percent of the naphthol. Suitable liquid diluents include water, acetone, petroleum distillates and the like. Where the diluent is a liquid, the composition can contain as little as about 0.5 pound of naphthol per 100 gallons of diluent, the preferred concentration being from 0.5 to 2 pounds of naphthol per 100 gallons of diluent. Other pesticidal adjuvants, including conventional wetting, dispersing, and emulsifying agents, can also be added to the formulation. The amount of naphthol deposited on the material can range from 0.01 to 1.0, preferably 0.1 to 0.5, pound of naphthol per square yard of material.

The naphthols of this invention wherein Y and Z are not nitro can be prepared by reacting, in the presence of a suitable catalyst, 1,5-hexadiene with a substituted phenol having the formula

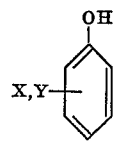

wherein X and Y independently occupy the 2, 3 or 4 positions; X is hydrogen, fluorine, chlorine or bromine; and Y is fluorine, chlorine, bromine or lower alkoxy. The reaction product is a 5,8-dimethyl-5,6,7,8-tetrahydro-1-naphthol having substituents in the 2, 3, and 4 positions corresponding to the substituents in the 2, 3 and 4 positions of the substituted phenol reactant. If Y is lower alkoxy, X is preferably hydrogen; and if Y is halogen, X is preferably hydrogen or a like halogen.

Suitable catalysts include boron trifluoride etherate and aluminum phenate (triphenoxyaluminum), with aluminum phenate being preferred. The aluminum phenate catalyst can be prepared *in situ* by heating a suspension of aluminum and the substituted phenol to be employed in the cyclialkylation reaction to between about 150° C. and 200° C. until hydrogen evolution has ceased. Alternatively, the aluminum phenate catalyst can be prepared beforehand from the same or different phenolic reactant and stored prior to use. As used herein, the term "aluminum phenate" includes aluminum phenates derived from phenols having the formula

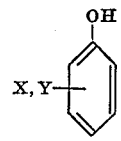

wherein X is hydrogen, fluorine, chlorine or bromine and Y is hydrogen, fluorine, chlorine, bromine or lower alkoxy.

When aluminum phenate is used as the catalyst, the reaction can be carried out at temperatures ranging from 125° C. to about 250° C., with the preferred temperature range being from about 160° C. to about 230° C. When boron trifluoride ethereate is used as the catalyst, the reaction can be carried out at temperatures ranging from about 0° C. to about 80° C., with the preferred temperature range being from about 20° C. to 60° C. With either catalyst, the reaction proceeds readily at atmospheric pressure, but pressures departing from atmospheric can be used if desired.

The weight ratio of catalyst to 1,5-hexadiene can be from about 1:100 to about 1:0.5, with the preferred ratio being from about 1:10 to about 1:1.

The reactants can be added to the reaction mixture in any desired ratio, but normally it is desirable to employ an excess of the substituted phenol to avoid undesirable side reactions producing higher molecular weight by-products. If desired, an inert solvent can also be added to the reaction mixture. Suitable solvents include chlorobenzene and nitrobenzene. Lower boiling solvents, such as carbon disulfide, can also be used at the temperatures employed when boron trifluoride ethereate is used as the catalyst.

An alternative method of preparing the tetrahydronaphthols of this invention wherein X and/or Y are chlorine or bromine comprises treating with chlorine or bromine a 5,8-dimethyl - 5,6,7,8 - tetrahydro-1-naphthol having either or both of the 2 and 4 positions unsubstituted. It is desirable, but not essential, to carry out the reaction with the tetrahydronaphthol reactant dissolved in an inert solvent, such as dioxane. The reaction proceeds readily at ambient temperatures. Both mono- and dihalogenated products (separable by fractional distillation) can be prepared by this method. The compound 5,8-dimethyl-5,6,7,8 - tetrahydro-1-naphthol can be prepared in accordance with the method recited herein for preparing the substituted tetrahydronaphthols by using phenol instead of a substituted phenol as the reactant.

The tetrahydro naphthols of this invention wherein Z and/or Y are nitro are prepared by treating with nitric acid a 5,8-dimethyl-5,6,7,8-tetrahydro-1-naphthol having either or both of the 2 and 4 positions unsubstituted. The concentration of the nitric acid is not especially critical and can range from about 10 to about 90%, with the range 70 to 90% being preferred. The reaction proceeds readily at ambient temperature, but temperatures ranging from 0° C. to 100° C. can be used if desired. It is desirable, but not essential, to carry out the reaction with the tetrahydronaphthol reactant dissolved in an inert solvent, such as ether. Both mono- and dinitro products (separable by chromatography) can be prepared by this method.

The following examples further illustrate the invention. In each of the examples the reaction products were identified by infrared spectrum and nuclear magnetic resonance analyses.

EXAMPLES 1–4

Substituted phenols were cyclialkylated by reaction with 1,5-hexadiene in the presence of aluminum phenate. The aluminum phenate was prepared *in situ* by heating a suspension of the substituted phenol and aluminum to between 150° C. and 200° C. until hydrogen evolution had ceased. 1,5-hexadiene was then added slowly at a rate such that the temperature of the reaction mixture did not drop below 160° C. The reaction mixture was held at the indicated temperature for the indicated period of time after the addition was completed. The reaction mixture was then cooled, poured onto a system of ice and hydrochloric acid, extracted with ether, and then dried over sodium sulfate. The desired 5,8-dimethyl-5,6,7,8-tetrahydro-1-naphthol was then isolated by distillation. The results obtained are tabulated below.

| Substituted phenol | Grams of— | | | Reaction | | Grams of substituted 5,8-dimethyl-5,6,7,8-tetrahydro-1-naphthol recovered | Boiling point, ° C./mm. Hg |
| --- | --- | --- | --- | --- | --- | --- | --- |
| | Phenol | Aluminum | 1,5-hexadiene | Temp., ° C. | Time, hours | | |
| 4-methoxy | 200 | 4 | 51.7 | 215–230 | 2 | 51 | 135–145/0.5 |
| 2-chloro | 209 | 4 | 51.7 | 170–180 | 1.5 | 37 | 90–95/0.25 |
| 4-chloro | 208 | 4 | 51.7 | 170–190 | 1.5 | 30 | 110–115/0.25 |
| 4-fluoro | 100 | 2 | 25.8 | 175–185 | 3 | 18 | 96–109/0.8–1.0 |

EXAMPLE 5

A solution of 45 grams of potassium bromide, 30 grams of bromine, and 300 ml. of water was slowly added to a rapidly stirred solution of 8.7 grams of 5,8-dimethyl-5,6,7,8-tetrahydro-1-naphthol in 100 ml. of dioxane until a yellow color persisted (about 75 ml. required). The dioxane solution was poured into 200 ml. of water and sodium bisulfite was added to discharge the color. The solution was saturated with sodium chloride and extracted with methylene chloride. The organic phase was dried over sodium sulfate, concentrated under vacuum, and distilled to give 15.5 grams of 2,4-dibromo-5,8-dimethyl-5,6,7,8-tetrahydro-1-naphthol, boiling point 137–139° C. at 0.9 mm. Hg.

EXAMPLE 6

A solution of 10 grams of 5,8-dimethyl-5,6,7,8-tetrahydro-1-naphthol in 200 ml. of ether was treated with 50 ml. of 90% nitric acid with external cooling. The ether solution was then extracted several times with water, dried over sodium sulfate and concentrated to dryness under vacuum. The residue was chromatographed using a 50 x 4.5 cm. column of silica gel and eluted with a 1:1 solution of hexane and chloroform. The first 1300 ml. of eluent were concentrated to dryness and the residue was crystallized from hexane to give 7.6 grams of yellow crystals, melting point 72–88° C. These crystals were rechromatographed with hexane (300 ml.) to give 1.5 grams of yellow crystals, melting point 101–102° C., identified as 5,8 - dimethyl-4-nitro-5,6,7,8-tetrahydro-1-naphthol. Further elution with a 4:1 solution of hexane and chloroform afforded 5.0 grams of yellow-green crystals, melting point 92–94° C., identified as 5,8-dimethyl-2,4-dinitro-5,6,7,8-tetrahydro-1-naphthol.

EXAMPLE 7

This example illustrates the insecticidal, miticidal and nematocidal effectiveness of the naphthols prepared in accordance with the preceding examples. Solutions having concentrations corresponding to two pounds of each naphthol in 100 gallons of a 1:1 solution of acetone and water were prepared. Each solution was sprayed for 7 seconds on English broad bean plants and for 5 seconds on pea aphid adults, separately, and then the aphids were placed on the plants. The spray was delivered at a rate of about 0.6 cc. per second. The solution was also sprayed for 7 seconds on young cranberry plants infested with two-spotted spider mites (all stages). A portion of each solution was stripped of acetone, diluted with water to a concentration of 500 p.p.m. of naphthol, combined with 0.1% by weight of Triton X–155 wetting agent and sprayed on sour mash nematodes. Mortality observations were made three days after treatment. The percent of nematodes killed was estimated by visual inspection under a microscope. The results are tabulated below.

| 5,8-dimethyl-5,6,7,8-tetrahydro-1-naphthol | Percent killed | | |
| --- | --- | --- | --- |
| | Pea aphids | Mites | Nematodes |
| 4-methoxy | 100 | 72.2 | 15 |
| 4-chloro | 100 | (1) | 100 |
| 2,4-dibromo | 45.5 | 100 | 10s |

[1] Not tested.

Comparable insecticidal, miticidal and nematocidal activity is exhibited by the other substituted tetrahydronaphthols of this invention.

We claim:
1. 5,8-dimethyl - 5,6,7,8 - tetrahydro-1-naphthols having the formula

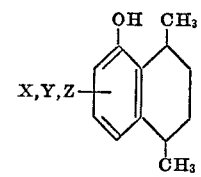

wherein X, Y and Z independently occupy the 2, 3 and 4 positions; X is hydrogen, fluorine, chlorine or bromine; Y is fluorine, chlorine, bromine or nitro; and Z is hydrogen or nitro; and wherein Y may additionally be lower alkoxy when Z is hydrogen.

2. 5,8-dimethyl - 5,6,7,8 - tetrahydro-1-naphthols according to claim 1 wherein X is hydrogen and Y is lower alkoxy.

3. 5,8 - dimethyl - 5,6,7,8-tetrahydro-1-naphthols according to claim 2 wherein Z is hydrogen.

4. 5,8-dimethyl - 5,6,7,8 - tetrahydro-1-naphthols according to claim 1 wherein X is hydrogen and Y is fluorine, chlorine or bromine.

5. 5,8-dimethyl - 5,6,7,8 - tetrahydro - 1 - naphthols according to claim 4 wherein Z is hydrogen.

6. 5,8-dimethyl - 5,6,7,8 - tetrahydro-1-naphthols according to claim 1 wherein X is fluorine, chlorine or bromine and Y is a like halogen.

7. 5,8-dimethyl-5,6,7,8-tetrahydro - 1 - naphthols according to claim 6 wherein Z is hydrogen.

8. 5,8 - dimethyl - 5,6,7,8 - tetrahydro-naphthols according to claim 1 wherein X is hydrogen and Y is nitro.

9. 5,8-dimethyl - 5,6,7,8 - tetrahydro-1-naphthol according to claim 5 wherein Y is chlorine in the 4 position.

References Cited

UNITED STATES PATENTS 2,410,497  11/1946  Henrich et al. _____ 260—623

OTHER REFERENCES

Vesely et al.: "Collection of Czechoslavok, Chem. Comm." (1930), pp. 145–157.
Plummer: "Chem. Abs.," vol. 49, pp. 6940–41.
Woodcook et al.: "Chem. Abs.," vol. 52, p. 9050.
Bruson et al.: "J.A.C.S.," vol. 62, pp. 36–44 (1940).
Datta et al.: "J. Organic Chem.," vol. 26 (1960), pp. 932–935.

BERNARD HELFIN, Primary Examiner

W. B. LONE, Assistant Examiner

U.S. Cl. X.R.

260—613 D, 623 R; 424—341, 346, 347, 348